Dec. 16, 1941.  H. C. SHEAFFER  2,266,338
MILLING MACHINE
Filed Aug. 14, 1940  4 Sheets-Sheet 1

WITNESS
F. J. Hartman.

INVENTOR
Harry C. Sheaffer.
BY George K. Hilbert
ATTORNEY

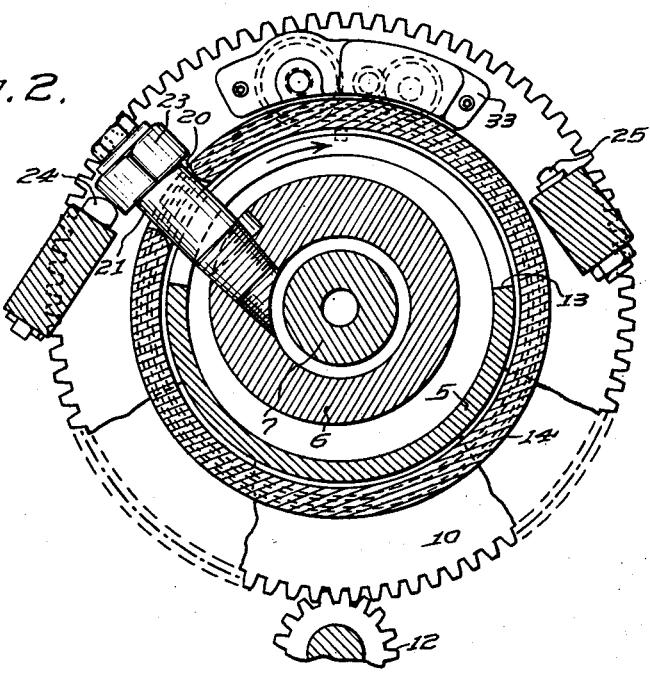
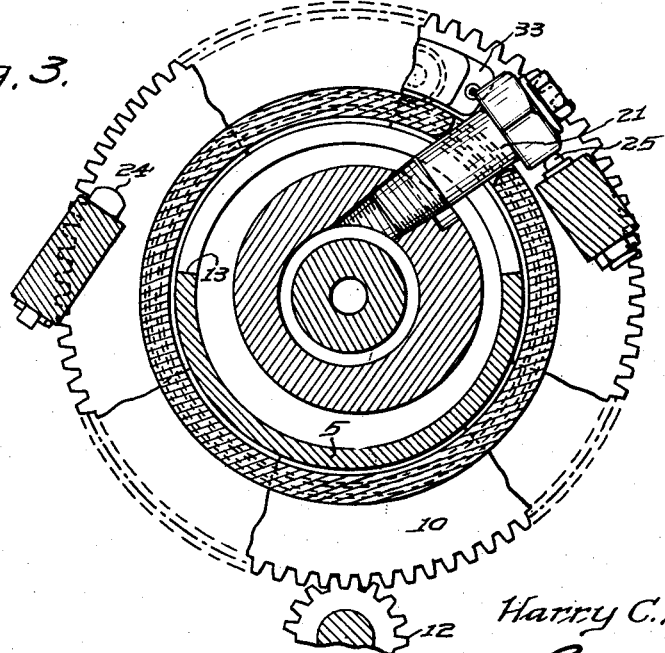

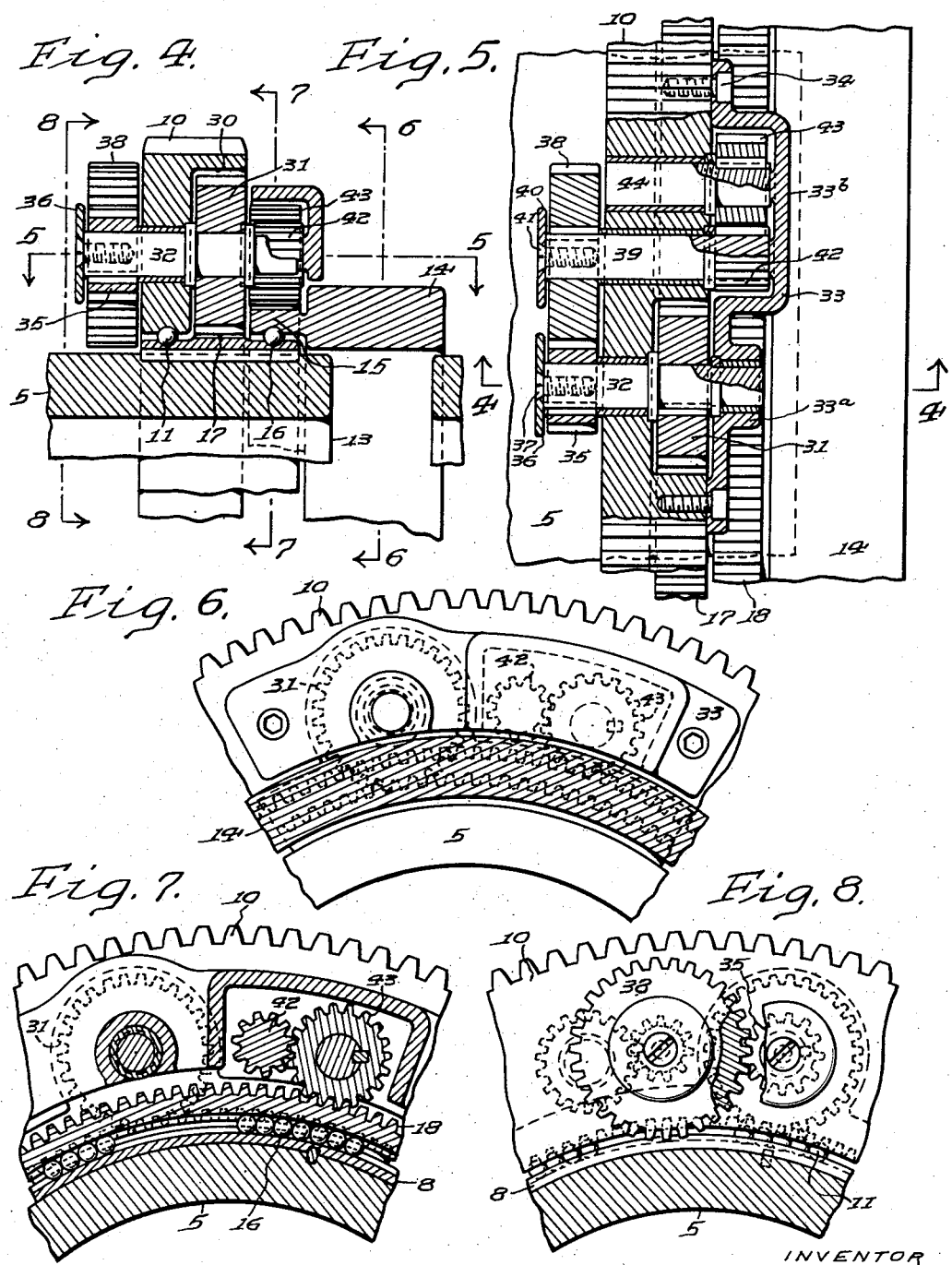

Dec. 16, 1941.  H. C. SHEAFFER  2,266,338
MILLING MACHINE
Filed Aug. 14, 1940  4 Sheets—Sheet 4

INVENTOR
Harry C. Sheaffer.
BY
ATTORNEY

WITNESS
F. J. Hartman.

Patented Dec. 16, 1941

2,266,338

UNITED STATES PATENT OFFICE 2,266,338

MILLING MACHINE

Harry C. Sheaffer, North Hills, Pa., assignor to The Hall Planetary Company, Philadelphia, Pa., a corporation of Pennsylvania Application August 14, 1940, Serial No. 352,495

10 Claims. (Cl. 10—154)

This invention relates to milling machines of the general type disclosed in the following United States Letters Patent: 1,316,718, September 23, 1919; 1,507,235, September 2, 1924; 1,899,865, February 28, 1933; 2,008,757, July 23, 1935; 2,081,275, May 25, 1937; and 2,177,319, October 24, 1939, and is particularly directed to the provision of means for varying within limits the speed at which the cutter is moved to depth in the work during the early part of the operating cycle and withdrawn therefrom at a later time in the cycle after it has finished its cut.

Milling machines of the type generally exemplified in the aforementioned patents, commercially known as "Planetary" milling machines, have been gradually improved during the considerable period which has elapsed since they were first placed on the market with resultant increase in operative efficiency, adaptability to various lines of work and greater ease of adjustment and/or repair so that as now manufactured they are capable of performing a very wide range of milling operations and are employed in many lines of industry.

During their operating cycle the rotating cutter is first moved to depth in the work, next slightly in excess of 360° around a circular orbit concentric with the surface to be produced on the work by the milling operation, then out of engagement with the work along substantially the same path which was followed in moving it thereinto, and finally around a similar circular orbit but in the opposite direction to return the cutter and associated mechanism to starting position; during its orbital movement the cutter is also progressively moved axially when the machine is used for milling straight threads and radially of its orbit as well when milling taper threads.

These several movements of the cutter, save that of its rotation on its own axis, are effected through coordinated operation of a cylindrical outer or main container within which in an eccentric longitudinal bore is a cylindrical inner or secondary container in which the cutter spindle is, in turn, also eccentrically journaled. To bring the rotating cutter to depth in the work, which is held in fixed relation to the bed of the machine by a suitable chuck or fixture the character of which is determined by the configuration of the work piece, the secondary container is turned in the main container for a predetermined distance so as to carry the cutter in an arcuate path toward and finally into the work until the desired depth of cut therein is obtained, whereupon the main container is set in motion and the two containers are revolved as a unit until the cutter has completed its orbital movement and thus finished its cut; movement of the main container is then arrested and the secondary container turned relatively thereto in reverse direction so as to withdraw the cutter from the work, after which the main container and secondary container are revolved as a unit in reverse direction until they attain their initial position, thus completing the cycle of the machine.

For attainment of maximum rapidity of production and perfection of finish, a cutter of the largest permissible diameter always should be used so as to secure the greatest sweep of the cutter in the work and cause the latter to be attacked by the maximum number of cutter teeth at any given instant while it is being milled, but the greater the diameter of the cutter in relation to the diameter of the work, the greater is the strain imposed upon both when the cutter is being brought to depth. It results that, speaking generally, the larger the cutter the slower must be its initial movement into the work especially if the metal to be cut is very hard, for a cutter capable of adequately sustaining the duty imposed on it during its subsequent orbital movement about the work frequently cannot withstand the very much greater duty to which it is subjected while being brought to depth. It is therefore essential that the cutter be moved to depth at a speed sufficiently low to prevent damage to it or to the work but in the interest of production this speed should be as high as existing operating conditions will permit, for that portion of the operating cycle required for moving the cutter from initial position to depth and subsequently withdrawing it therefrom is nonproductive and any unnecessary increase therein is directly reflected in the time required to perform a given milling operation.

Machines of the character under discussion are of the "production" type, that is, primarily intended for the machining of a large number of similar pieces and hitherto when designing one of them for the performance of a certain job such, for example, as the finishing of a portion of an aeroplane motor cylinder head, it consequently has been necessary to accord careful consideration to the relation between the diameter of the work and the cutter to be used, the character of the metal to be cut and the depth of cut to be taken therein to insure that the cutter will be brought to depth in the minimum time commensurate with safety. This has militated to some extent against the desirable practice of building the machines for stock in relatively large lots with corresponding reduction in manufacturing costs, for such stock machines could not always be readily adapted for the differing requirements of their future purchasers as the specific design of certain parts had often to be varied in accordance with the particular job to be performed by the machine, and it has therefore been the usual practice to more or less specially build each machine to mill a designated piece of work.

It sometimes happens, moreover, that the purchaser of a machine intended to mill a certain piece may later wish to employ it for machining some other piece of different design, or of harder material, or one which necessitates the use of a cutter of different size, so that for these or other reasons it is desirable to either increase or decrease the speed at which the cutter is fed to depth. But with the machines as heretofore constructed it was often difficult if not impossible for the owner to readily adapt his machine to the new use and maintain maximum productive capacity without risk of cutter damage and he was therefore either left with a more or less useless machine on his hands or forced to return it to the factory for partial reconstruction to fit it for the new conditions under which he desired to operate it.

A principal object of my invention, therefore, is to provide in a machine of the character aforesaid means whereby the speed at which the cutter is fed into and withdrawn from the work may be readily varied within limits without changing the relative eccentricity of the secondary and main containers.

A further object is to provide means for the performance of this function which may be incorporated in the machine without affecting its basic design or principle of operation and through the medium of which the desired change of speed may be quickly accomplished, preferably by merely changing the ratio between a single pair of readily removable gears.

Other objects, advantages and novel features of design, construction and operation comprehended by the invention are hereinafter more fully pointed out or will be apparent to those skilled in the art from the following description of a typical milling machine embodying the improvement during which reference will be had to the accompanying drawings in which only so much of the machine itself is shown in detail as is requisite for a proper understanding of the invention.

In the said drawings Fig. 1 is a side elevation, partially broken away into longitudinal central section, of a milling machine of the general type exemplified by the aforesaid patents having combined and associated therewith mechanism constructed in accordance with the present invention;

Fig. 2 is a fragmentary transverse section on a slightly reduced scale substantially on the line 2—2 in Fig. 1, and Fig. 3 is a similar section showing certain of the parts in a different position.

Fig. 4 is an enlarged fragmentary detail in central vertical section of a portion of the mechanism shown in Fig. 1, the plane of section of this figure being indicated by the line 4—4 in Fig. 5.

Fig. 5 is a fragmentary horizontal section on the line 5—5 in Fig. 4; and

Figure 1:
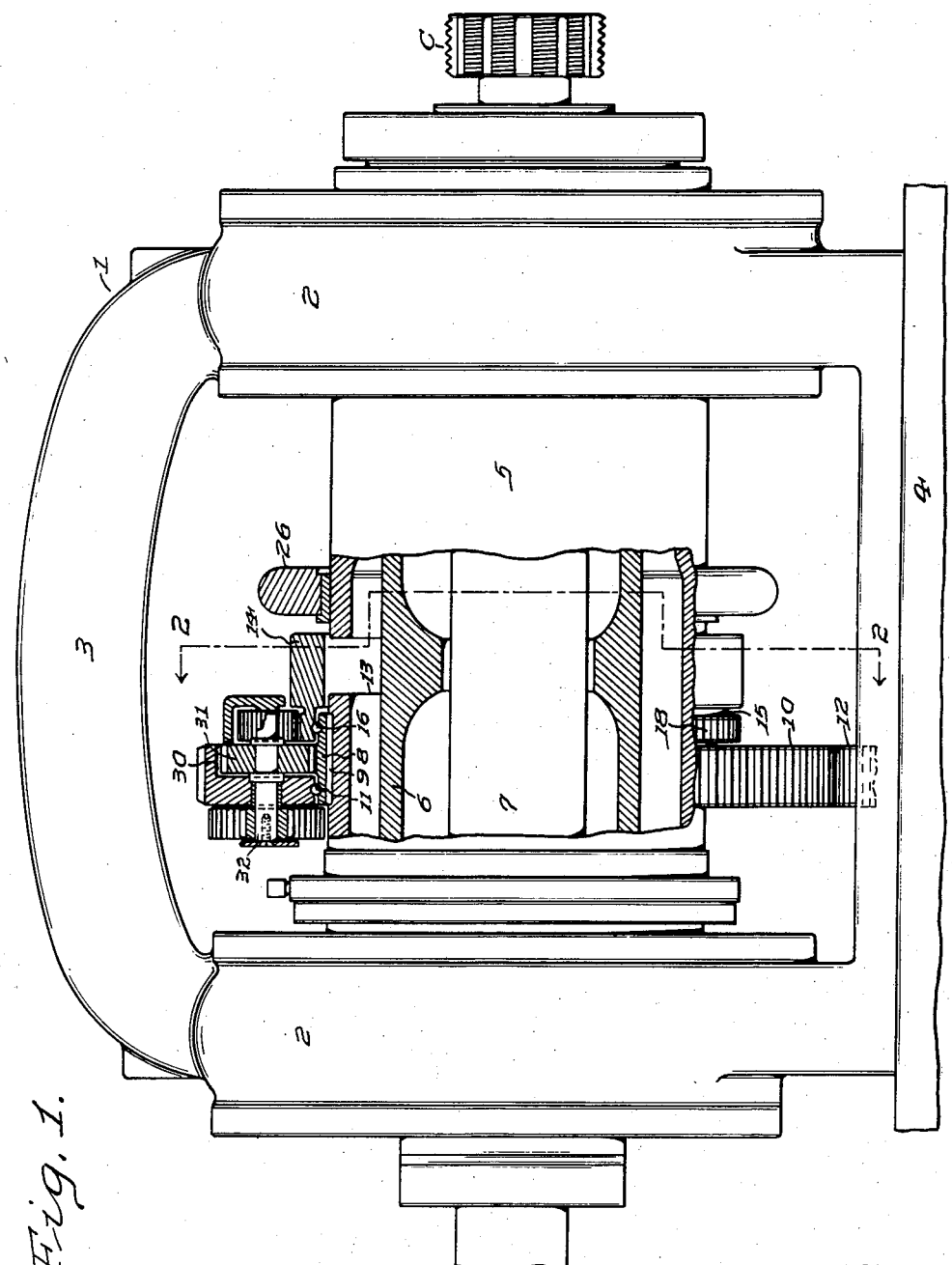

Figs. 6, 7 and 8 are respectively fragmentary vertical sections on lines 6—6, 7—7 and 8—8 in Fig. 4.

Figs. 9 to 12 inclusive are respectively diagrammatic views primarily illustrating the eccentric relation of the containers and cutter spindle and the extent of movement required to bring cutters of different diameters from initial position to depth in a given piece of work.

Throughout the drawings the same characters of reference are used to designate the same parts and the directions in which the sections are taken are indicated by arrows on the lines of section.

To enable those skilled in the art to comprehend and practise the invention a brief description will first be given of the principal features of construction and operation of the "Planetary" milling machine shown in the drawings which is of the general type heretofore mentioned, after which the modifications that are made therein and details of the additional mechanism which is combined therewith to attain the objects of the invention will be pointed out with greater particularity.

In its commercial embodiment said machine comprises, among other things, a unitary frame 1 provided with cylindrical horizontally aligned longitudinally spaced housings 2—2 tied together by a yoke 3 and a base 4. Extending through the housing is a hollow cylindrical main container 5 journaled on suitable bearings in the housings and, extending within and from one end to the other of the main container is a secondary container 6 eccentrically mounted for limited rotation therein; within and eccentrically journaled in the second container is a longitudinally extending cutter spindle 7 which at its forward end beyond the adjacent housing and containers supports the cutter C and at its rear end, also beyond the containers, is supplied with suitable driving mechanism (not shown) whereby it may be driven independently of the containers to effect axial rotation of the cutter.

Between the housings 2 the main container is surrounded by a preferably hardened band 8 secured to the container by a key 9 so it will rotate therewith, and in turn surrounding one end of this band is the main driving gear 10, ball or other anti-friction bearings 11 being interposed between the gear and the band. This gear meshes with a pinion 12 on a shaft (not shown) near the base of the machine which is interconnected with suitable mechanism for driving the shaft so as to rotate the gear in either direction when and as required.

Preferably forward of the driving gear the main container is provided with a slot 13 extending a little less than half way around its periphery and aligned with this slot is a sleeve 14 having a lateral flange or offset 15 extending over the adjacent end of band 8, ball or other suitable anti-friction bearings 16 being interposed between the offset and the band which thus forms the inner race for the bearings respectively supporting the drive gear and sleeve. The periphery of the band between the two sets of bearings and the periphery of offset 15 are respectively provided with gear teeth 17 and 18 which may extend entirely around the parts as shown or for a lesser distance as long as it is sufficient to enable the teeth to perform their intended functions as hereinafter described.

As best shown in Figs. 2 and 3, a hole 20 is formed in sleeve 14 through which is extended a driving stud 21 whose inner end is threaded into the secondary container, the wall of the hole being rounded off where it passes through the sleeve or other suitable provision being made to enable the relative positions of the stud and sleeve to alter slightly as required during the operation of the machine. At its outer end the stud is provided with a head 23 preferably in the form of a roll or block adapted to engage either of a pair of stops 24, 25 carried on a band 26 surrounding the main container and capable of rotative adjustment with respect thereto, suitable means (not shown) being provided for clamping the band in any desired position with respect to the container so that the stops, band and container will then form an operatively rigid unit.

It will now be apparent that if the parts hitherto described are substantially in the position shown in Fig. 2, that is, with the drive stud in contact with the back stop 24 positioned in proximity to the adjacent end of slot 13 by suitable adjustment of band 26, and the secondary container 6 be turned clockwise, i. e., in the direction of the arrow, the stud will move in the slot and carry sleeve 14 around with it until its head engages forward stop 25 and the main and secondary containers and the sleeve then will rotate as a unit as long as the secondary container continues to turn; likewise, that when the turning movement of the secondary container is arrested and then reversed, the drive stud and sleeve 14 will move together in the opposite direction and the main container will remain stationary until the head of the drive stud engages back stop 24 and the main and secondary containers and sleeve then will again turn as a unit until the secondary container is brought to rest.

It will be further apparent, particularly from an inspection of Figs. 2 and 3, that if the axis of cutter spindle 7 and hence of cutter C is coincident with the axis of the main container at the beginning of the clockwise movement of the secondary container, the cutter spindle axis will follow an arcuate path while the secondary container is moving relatively to the main container because of the eccentric mounting of the secondary container in the latter and, in turn, of the cutter spindle in the secondary container. This arcuate movement is therefore effective to bring the cutter to depth in the work, the extent of it of course determining the depth of cut, and after this movement is completed the ensuing unitary movement of the main and secondary containers carries the cutter about the work in the orbital path to which reference has been made so as to remove an amount of metal from its inner or outer periphery corresponding to the depth to which the cutter was fed in by the said initial movement of the secondary container. In like manner, partial counterclockwise rotation of the secondary container after the completion of the milling cut is effective to move the cutter spindle through the same arcuate path but in the opposite direction so as to withdraw the cutter from the work and return it to coaxial relation with the main container prior to completion of the operating cycle of the machine.

More particular reference will now be made to the means which, in accordance with the invention, are provided for imparting to the secondary container its independent turning movements whereby as just explained the cutter is brought to depth preparatory to its orbital movement about the work and also subsequently withdrawn from the latter, these means being most clearly shown in Figs. 1 and 4 to 8 inclusive.

Main driving gear 10 is of course freely rotatable about band 8 and projects for a suitable distance outwardly therefrom. At a convenient point the face of this gear adjacent sleeve 14 is provided with a recess 30 in which is received a gear 31 keyed to a shaft 32 extending through and journaled in main gear 10. This shaft projects entirely through both gears and at its forward end is journaled in a boss 33a in a cover plate 33 seating against and removably secured, as by screws 34, to the adjacent face of the main gear. At its other extremity the shaft carries a gear 35 keyed to the shaft but readily separable therefrom by sliding it axially outward after taking off a keeper plate 36 secured to the end of the shaft by a screw 37 and normally serving to maintain the gear in place. This gear is in meshing engagement with a gear 38 keyed to a shaft 39 paralleling shaft 32 and also extending entirely through main gear 10 and projecting from its opposite side, gear 38 being likewise separable from shaft 39 upon removal of its keeper plate 40 secured to the shaft by a screw 41. On its opposite end beyond driving gear 10 shaft 39 carries a pinion 42, keyed to the shaft so as to rotate therewith, which meshes with a gear 43 keyed on a third shaft 44, this gear in turn meshing with teeth 18 on offset 15 of sleeve 14. Where they pass through the driving gear all these several shafts are preferably suitably bushed and to prevent endwise movement are provided with flanges where necessary, while cover plate 33 is desirably formed as at 33b so as to enclose pinion 42 and gear 43 and also form an end stop for their shafts.

Gear 31 being in mesh with teeth 17 on band 8 is thus constrained to rotate when driving gear 10 is turned relatively to the band in either direction, thereby driving gear 35, gear 38, pinion 42 and gear 43 which, in turn, by its meshing engagement with teeth 18 turns sleeve 14 and so, through the medium of drive stud 21, correspondingly turns the secondary container independently of the main container whenever the drive stud is moving between stops 24 and 25.

Of course as soon as the movement of the drive stud in either direction brings its head into contact with one of stops 24, 25 further rotation of the secondary container with respect to the main container is prevented with consequent cessation of relative movement between the various gears comprised in the gear train extending from the gear teeth 17 on band 8, which always turns with the main container, to teeth 18 on sleeve 14 which is, in turn, connected to the secondary container through the driving stud. It results that under these conditions, main driving gear 10 is effective to drive the main and secondary containers as a unit in the same direction in which it is rotating and at the same speed.

It will be noted that the gear train interposed between the main drive gear and sleeve 14 is so designed that when it is operative to turn the secondary container relatively to the main container the drive gear and the secondary container always turn in the same direction but not necessarily at the same speed since their relative speed of rotation is determined by the ratio of the gear train through which they are interconnected. This ratio can very readily be varied by removing gears 35 and 38, for convenience termed "pick-off gears," and substituting others of different relative diameter with the result that it is possible by this simple operation to cause sleeve 14 and hence the secondary container to turn faster or slower with relation to the speed of rotation of main driving gear 10 which is preferably relatively slow but constant from the initiation of the operative cycle of the machine until after the cutter has performed its duty and been withdrawn from the work, and constant but relatively faster during the remaining portion of the cycle so as to effect a quick return of the parts to initial or starting position.

Reference may now be had to diagrammatic Figs. 9 to 12 inclusive for a better understanding of certain of the advantages realized by the invention. Thus, Fig. 9 typifies a transverse section through main container 5', secondary container 6' and cutter spindle 7' with the parts in initial or starting position in which, it will be noted, the axis of the cutter spindle is coincident with that of the main container at O and the axis of the secondary container is at Y. The distance OY therefore represents the amount of eccentricity between the main and secondary containers in this typical machine, and line P the path of the cutter spindle axis when the secondary container is turned relatively to the main container.

Figure 9:
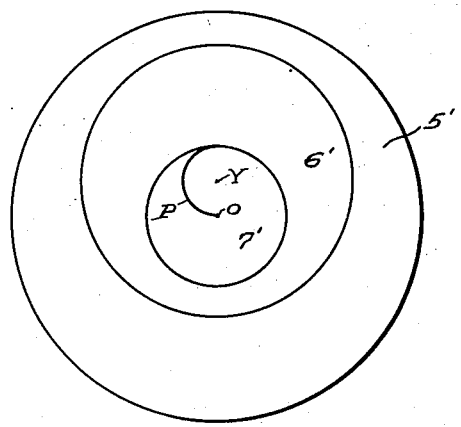
Figure 10:
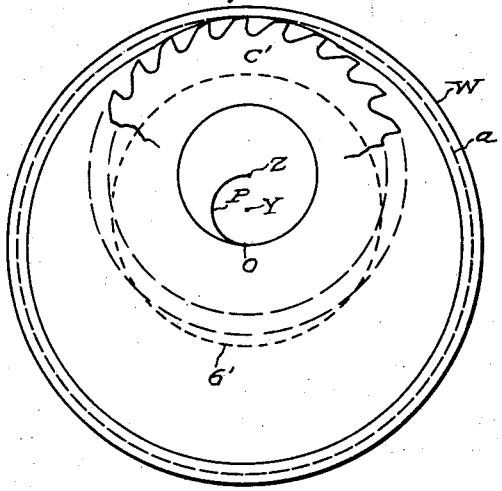

In Fig. 10 there is shown a cylindrical work piece W the interior of which is to be milled out to the line a using a cutter C' of the smallest diameter which can be employed in the machine for this operation, and it will be apparent from an inspection of this figure that to bring this cutter to depth in the work it would be necessary to turn the secondary container 180° from the position of Fig. 9 and further that the sweep of the cutter when in to depth is relatively small in comparison with the inner circumference of the work. Now as heretofore pointed out, these conditions induce poor operating efficiency since a relatively large amount of non-productive time is required for moving the cutter from starting position in which its axis is at O to full depth position in which its axis is at Z and, after the cut is finished, in returning it along the same path P while, moreover, the work is attacked at any given instant by a relatively small number of cutter teeth because of the relatively short sweep of the cutter therein. On the other hand, due to the relatively great difference between the diameter of the cutter and that of the work, the strain imposed on the former while it is moving in to depth is relatively small and still less while it is thereafter moving about the work, so that the rate at which the cutter traverses the path P from O to Z can be relatively high without damaging either the cutter or the work. Obviously, however, in a case in which a cutter of this character is to be used, the non-productive time of the total cycle can be materially reduced by increasing, through the substitution of suitable pick-off gears 35 and 38, the rate at which the secondary container is turned relatively to the main container.

Figure 11:
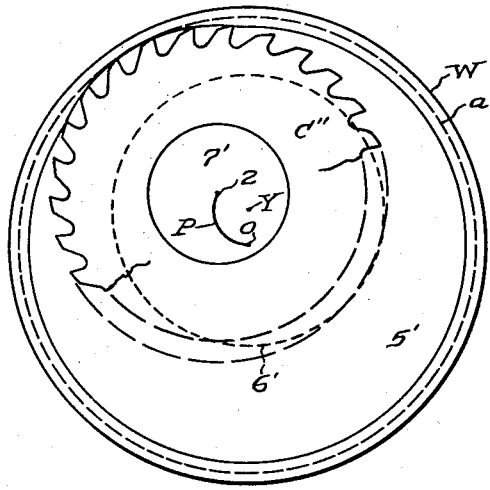

In Fig. 11 the work and depth of cut are of the same size as in Fig. 10 but a larger cutter C" is employed, thus obtaining a greater sweep in the work and shortening path P which the axis of the spindle must travel in bringing the cutter to depth and subsequently withdrawing it therefrom. Assuming that we are here cutting a softer metal than in Fig. 10 so that the cutter can be safely moved to depth at the same rate as in the former case, the non-productive time of the cycle is obviously shortened by the use of the larger cutter and a greater cutter sweep in the work attained.

Figure 12:
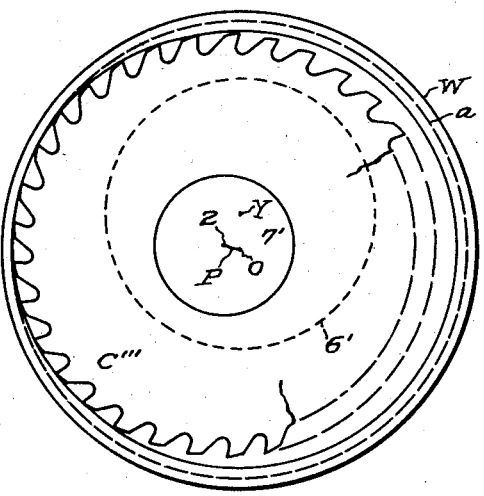

In Fig. 12 a still larger cutter C''' is utilized with corresponding greater sweep in the work and shortening of the path P necessary to bring it to depth. But obviously the strain imposed on the cutter and the work as it moves to depth is here much greater if the metal is the same as in the preceding case with the result that if the cutter moves to depth at the same rate it might collapse. Consequently, the rate should be suitably decreased which can be very readily effected by the substitution of different pick-off gears. It will be noted that with the use of this very large cutter, the diameter of which is almost as great as that of the interior of the work, path P becomes very short so that even though the rate at which the cutter is moved to depth is materially decreased in the interest of safety, the non-productive time of the machine is little or no greater and perhaps even less than when a smaller cutter is used, while the sweep of the cutter in the work is very long.

It will now be apparent that a machine embodying my invention may be readily adjusted to conform to varying operating conditions such as hardness of metal to be cut, varying sizes of cutters with respect to the diameter of the work and other factors which it has heretofore been necessary to take carefully into account when designing a machine for the performance of a particular job, and that by suitable variation of the speed of rotation of the secondary container with respect to the main drive gear through the substitution of different pick-off gears 35 and 38, the non-productive time in the cycle of the machine may be readily kept at a minimum commensurate with the work being done and the size of cutter being employed. It results that the machines may be built in relatively large lots with main and secondary containers of standard relative eccentricity and these stock machines then adapted to the requirements of different jobs and different customers in a minimum of time by simply installing proper pick-off gears without any structural changes. On the other hand, the purchaser of a given machine in which the gear train between the main drive gear and sleeve 14 has been adjusted at the factory in accordance with his then requirements can later by substitution of other pick-off gears readily adapt the machine for a different job without sacrifice of productive capacity or danger of cutter breakage.

While for convenience of illustration and description reference has been made more particularly to a machine equipped with a cutter having teeth on its periphery and to the use of such cutter for milling the interior of a work piece, it will be appreciated the invention is of equal advantage and utility when using a like cutter for milling the exterior of a piece or when using one of the types of cutters, of which there are many, designed to surround the piece and likewise mill its exterior, for the same principles of operation to attain maximum speed of production namely, to use a cutter of as large diameter as possible and to move it into and withdraw it from the work in the least time commensurate with safety, apply equally to all milling irrespective of the particular type of cutter employed and the invention enables these principles to be utilized to maximum advantage.

Moreover, it is to be understood that while the embodiment of the invention herein shown and described is satisfactorily operative for the performance of its intended functions, the details of design, construction and/or arrangement of the various instrumentalities employed are susceptible of modification and alteration in numerous particulars without departing from the spirit and scope of the invention as defined in the appended claims.

Having thus described the invention, I claim and desire to protect by Letters Patent of the United States:

1. A machine of the class described comprising a main container, a secondary container rotatable therein, a main driving gear rotatably surrounding the main container, and secondary container driving means including a gear train interposed between the drive gear and the secondary container operative to turn the latter in and to a limited extent independently of the main container in correspondence to but at a rate other than the rate of rotative movement of the drive gear.

2. A machine of the class described comprising a main container, a secondary container rotatable therein, a main driving gear rotatably surrounding the main container, and secondary container driving means including a gear train interposed between the secondary container and the drive gear whereby the drive gear when rotating relatively to the main container is effective to turn the secondary container to a limited extent in and independently of the main container at a rate with respect to the rotational speed of the drive gear determined by the ratio of said train.

3. A machine of the class described comprising a main container, a secondary container rotatable therein, a main driving gear rotatably surrounding the main container, a sleeve also rotatably surrounding said container, driving means interposed between the sleeve and secondary container, and a gear train interconnecting the main drive gear and said sleeve adapted to turn the latter and hence, through said driving means, the secondary container in correspondence with movements of the drive gear at a rate with respect to the latter determined by the ratio of the gear train.

4. A machine of the class described comprising a main container, a secondary container rotatable therein, a main driving gear rotatably surrounding the main container, a sleeve also rotatably surrounding said container, a series of gear teeth rotatable with the main container, a series of gear teeth rotatable with the sleeve, and a plurality of gears carried by the drive gear and interposed between said series of teeth operative when the main container is stationary to turn the sleeve in correspondence with movements of the drive gear at a rate determined by the ratio of said gears.

5. A machine of the class described comprising a main container, a secondary container rotatable therein, a main driving gear rotatably surrounding the main container, a sleeve also rotatably surrounding said container, a series of gear teeth rotatable with the main container, a series of gear teeth rotatable with the sleeve, a plurality of gears carried by the drive gear and interposed between said series of teeth operative when the main container is stationary to turn the sleeve in correspondence with movements of the drive gear at a rate determined by the ratio of said gears, and means interconnecting the sleeve and the secondary container operative to turn the latter in correspondence with the movements of the sleeve.

6. A machine of the class described comprising a main container and a secondary container rotatable in the main container, a series of gear teeth rotatable with the main container, a sleeve rotatably surrounding the main container and having a series of gear teeth, means interconnecting the sleeve and secondary container for limited rotational movement with respect to the main container, a main drive gear rotatably surrounding the main container, and gears carried by the drive gear and cooperative with each other and with said series of teeth whereby rotation of the drive gear about the main container is effective through said gears to turn the sleeve and secondary container at a rate determined by the ratio of said gears.

7. A machine of the class described comprising a main container having a slot extending partly around its periphery, a secondary container rotatable in the main container, a series of teeth fixed on the main container, a sleeve rotatable about the main container, a driving stud extending therefrom through the slot in the secondary container, a series of teeth on the sleeve, a main driving gear rotatable about the main container, and a train of gears carried by the drive gear interconnecting the two series of teeth whereby rotation of the drive gear relatively to the main container is operative through said gears and teeth to turn the secondary container in the main container at a speed relative to that of the drive gear determined by the ratio of said gears.

8. A machine of the class described comprising a main container having a slot extending partly around its periphery, a secondary container journaled in the main container, a band surrounding and fixed on the main container, a series of teeth on said band, a sleeve surrounding the main container and overlying the band, antifriction bearings between the band and the sleeve, means extending through the slot connecting the sleeve and the secondary container, a drive gear rotatably surrounding the band, antifriction bearings between said gear and band, a series of teeth on the sleeve, and a train of gears carried by the main drive gear interconnecting said two series of teeth whereby rotation of the drive gear in either direction is effective to turn the sleeve and hence the secondary container at a rate determined by the ratio of said gears.

9. A machine of the class described comprising a main container, a secondary container rotatable therein and to a limited extent independently thereof, a main drive gear rotatably surrounding the main container, means for driving said gear at a predetermined rate, and means interposed between the drive gear and the secondary container operative to turn the latter at a different rate when the drive gear is rotated about the main container.

10. A machine of the class described comprising a main container, a secondary container rotatable therein, a main drive gear rotatably surrounding the main container, means for driving said gear at a predetermined rate, and means interposed between the drive gear and the secondary container operative when the drive gear is rotated about the main container to turn the secondary container to a limited extent in and independently of the main container and adjustable to vary the rate of said turning relatively to that of the drive gear.

HARRY C. SHEAFFER.